(12) United States Patent
Fairman et al.

(10) Patent No.: US 11,326,951 B2
(45) Date of Patent: May 10, 2022

(54) SYSTEM FOR COLORIMETRY AND A TRANSFORMATION FROM A NON-UNIFORM COLOR SPACE TO A SUBSTANTIALLY UNIFORM COLOR SPACE

(71) Applicant: Columbia Insurance Company, Omaha, NE (US)

(72) Inventors: Hugh S. Fairman, Stillwater, NJ (US); Joachim Hackl, Morris Plains, NJ (US); Thomas P. Tomsia, East Stroudsburg, PA (US)

(73) Assignee: Columbia Insurance Company, Omaha, NE (US)

( * ) Notice: Subject to any disclaimer, the term of this patent is extended or adjusted under 35 U.S.C. 154(b) by 175 days.

(21) Appl. No.: 16/706,048

(22) Filed: Dec. 6, 2019

(65) Prior Publication Data
US 2021/0172801 A1 Jun. 10, 2021

(51) Int. Cl.
*G01J 3/46* (2006.01)

(52) U.S. Cl.
CPC ......... *G01J 3/463* (2013.01); *G01J 2003/467* (2013.01)

(58) Field of Classification Search
CPC .............................. G01J 3/463; G01J 2003/467
See application file for complete search history.

(56) References Cited

U.S. PATENT DOCUMENTS

| 8,437,053 B2 | 5/2013 | Edge |
| 2008/0215279 A1 | 9/2008 | Salsbury et al. |
| 2009/0040564 A1 | 2/2009 | Granger |
| 2012/0099788 A1 | 4/2012 | Bhatti et al. |
| 2016/0261772 A1 | 9/2016 | Mcelvain |

OTHER PUBLICATIONS

Fairman, Hugh S. "The Fundamental Theorem of Tristimulus Integration." Color Res Appl. 2019; 1-5. https://doi.org/10.1002/col.22431.
Penrose, R. A Generalized Inverse for Matrices. Jul. 26, 1954.
(Continued)

*Primary Examiner* — Mark R Gaworecki
(74) *Attorney, Agent, or Firm* — The H.T. Than Law Group

(57) ABSTRACT

Disclosed is a method for organizing a substantially uniform system of colorimetry comprising the steps of
(i) taking a pseudoinverse of a matrix containing intensity values for an existing non-uniform color-matching functions;
(ii) optionally normalizing the pseudoinverse matrix from step (i);
(iii) empirically determining an opponency transformation matrix based on a plurality of substantially uniformly spaced color standards;
(iv) transforming the matrix from step (ii) to a color opponency color coordinate utilizing the opponency transformation matrix from step (iii) to obtain a Red-Green, Yellow-Blue and Lightness (RG, YB and LT) color matching functions; and
(v) transforming the RG, YB and LT color matching functions from step (iv) non-linearly to color matching functions that produce colors recognizable as being uniform by human vision;
wherein after step (v) the existing non-uniform color matching functions are transformed into substantially uniform color matching functions.

11 Claims, 10 Drawing Sheets

(56) References Cited

OTHER PUBLICATIONS

Lopez-Bonilla, J. et al. "Moore-Penrose's Inverse and Solutions of Linear Systems." World Scientific News. Jun. 14, 2018.
International Search Report and Written Opinion issued in connection with the corresponding International Application No. PCT/US2020/061232 dated Feb. 10, 2021.
Stone, Maureen C. A Survey of Color for Computer Graphics. Aug. 12, 2001. SIGGRAPH 2001. [online] [retrieved from internet <url: https://graphics.stanford.edu/cs448b-02-spring/04cdrom.pdf>; pp. 7-17.
Fairman, Hugh S. et al. "How the CIR 1931 Color-Matching Functions Were Derived from Wright-Guild Data." Color Research and Application. vol. 22, No. 1. Feb. 1997.
WD Wright. "The measurement of colour." Adam Hilger Ltd., London (1944); 2nd Edition (1958); 3rd Edition (1964); 4th Edition (1969). Distributed in the United States by Van Nostrand, New York.
EH Moore. "On the reciprocal of the general algebraic matrix." Bull. Amer. Math. Soc. 26, 394-395, (1920).
WS Stiles and JM Burch. Interim report to the Commission Internationale de l'Éclairage, Zurich, on the National Physical Laboratory's investigation of colour-matching. Optica Acta, 2, 168-181. (1955).
NL Speranskaya. Determination of spectrum color co-ordinates for twenty-seven normal observers, Optics and Spectroscopy, 7, 424 (1959).
DL MacAdam. Uniform Color Scales, J. Opt. Soc. Am., 64, 1691-1702, (1974).
DL MacAdam. Colorimetric data for samples of OSA uniform color scales. J. Opt. Soc. Am., 68, 121-130(1978).

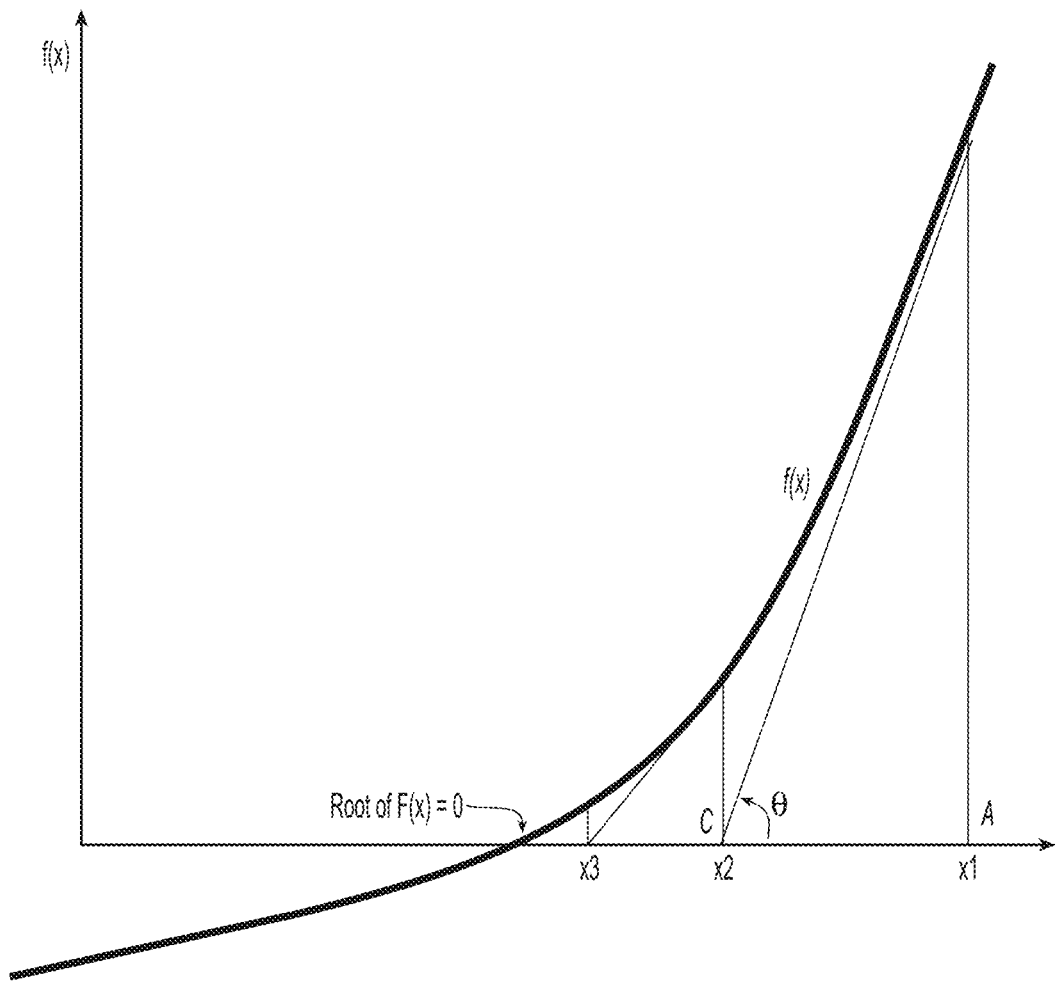
Fig. 8 (Appendix)

SYSTEM FOR COLORIMETRY AND A TRANSFORMATION FROM A NON-UNIFORM COLOR SPACE TO A SUBSTANTIALLY UNIFORM COLOR SPACE

FIELD OF THE INVENTION

The present invention relates to an improved system for colorimetry. The present invention further relates to transforming a non-uniform color space to a more uniform color space, or to develop a substantially uniform color space.

BACKGROUND OF THE INVENTION

The system for colorimetry that is universally utilized today was developed in 1931 by common agreement among nations that had national metrological laboratories operating in the field of colorimetric analysis. See Wright W. D., *The Measurement of Colour*. Adam Hilger Ltd., London (1944), $2^{nd}$ Edition (1958), $3^{rd}$ Edition (1964) and $4^{th}$ Edition (1969), and Fairman H. S., Brill M. H., and Hemmendinger H., "How the CIE 1931 Color-Matching Functions Were Derived from Wright-Guild Data," *Color Res. App.* 22, 11-23 (1997). The 1931 system of colorimetry comprises color matching functions developed separately by W. D. Wright and J. Guild in England. The 1931 system was limited to an observer's field that subtended 2° of solid angle.

The 1964 system was limited to an observer's field that subtended 10° of solid angle. Color matching functions for this system were first published by Stiles W. S. and Burch J. M in the Interim report to the Commission Internationale de l'Éclairage (CIE), Zurich, and the National Physical Laboratory's Investigation of Colour-Matching. *Optica Acta*, 2, 168-181 (1955), and were adopted in 1964. Color matching functions generally are a set of three curves and the 1964 CIE color matching functions are illustrated in FIG. 1A. Color matching functions are the amounts of three-color primaries that match a plurality of monochromatic wavelength passbands in a chosen reference white, e.g., usually the equal energy spectrum. The equal energy spectrum is a spectrum that contains equal radiant flux within each usually 10 nm wide passband in the visible region of the electromagnetic spectrum.

The 1964 primaries were red at a wavelength of 645.2 nm, green at a wavelength of 526.3 nm and blue at a wavelength of 444.4 nm. The horizontal axis shows the wavelengths within the visible electromagnetic spectrum of the white reference and the vertical axis shows the relative intensity of each primary necessary to make a match to each chosen interval within the white spectrum. The reference white has the same radiative power at every 10 nm interval. To match a color, an observer can adjust the intensities of each monochromatic primary until the mixture of the three primaries matches said portion of the equal energy spectrum. This process can be repeated for other wavelengths, so long as the wavelengths are substantially monochromatic. In one example, the color at 600 nm can be mixed with red at high intensity, relatively low green intensity and no blue, as illustrated in FIG. 1A.

A significant range of the red primary, e.g., between about 450 nm and 525 nm has intensities below the horizontal axis or has negative values. This signifies that within these wavelengths the reference color cannot be matched by any mixture of the primaries until the red primary is mixed with the reference then a match could be obtained.

While CIE has certain principles including to obviate the inconvenience of negative values, a linear transformation was used to convert the red (r), green (g), blue (b) values to $\bar{x}$, $\bar{y}$ and $\bar{z}$ values at 10° standard observer angle, as follows:

$$\bar{x}_{10} = 0.341080 \bar{r}_{10} + 0.189145 \bar{g}_{10} + 0.387529 \bar{b}_{10},$$

$$\bar{y}_{10} = 0.139058 \bar{r}_{10} + 0.837460 \bar{g}_{10} + 0.0733161 \bar{b}_{10}, \text{ and}$$

$$\bar{z}_{10} = o.000000 \bar{r}_{10} + 0.039553 \bar{g}_{10} + 2.026200 \bar{b}_{10}.$$

The r, g, b color matching functions shown in FIG. 1A in matrix form, discussed below, when multiplied by this linear transformation matrix is transformed to $\bar{x}_{10}$, $\bar{y}_{10}$, $\bar{z}_{10}$ color matching functions, as shown in FIG. 1B. The tristimulus values XYZ are obtained from the resulting color matching functions, which is chosen so that the Y-value represents the apparent brightness of the light entering the eye regardless of color.

It is noted that X, Y and Z are vectors each having data points that represent 10 nm bandwidth segments of the color matching functions r, g, b. The angles between vectors X, Y and Z were calculated, and the angle between X and Y is 142.27°; the angle between X and Z is 105.60° and the angle between Y and Z is 81.89°. See J. B. Cohen, Visual Color and Color Mixture, U. of Illinois Press., 2001 (hereinafter "J. B. Cohen"), pp. 166-67. In other words, the X, Y, Z vectors are non-orthogonal.

The XYZ tristimulus values can be used to express chromaticity, which is an objective specification of the quality of a color, that is, as determined by its hue and colorfulness (or saturation, chroma, or intensity). See Choudhury, A. K. R., *Principles of Colour and Appearance Measurement*, (2014), pages 270-317. Chromaticity coordinates x and y are calculated by $$x = X \div (X+Y+Z)$$

$$y = Y \div (X+Y+Z)$$

and x+y+z=1. The chromaticity coordinates and the Y-value, i.e., xyY, can specify a color with the intensity value represented by Y and the chromaticity represented in the xy plane. A plot of the chromaticity in xy plane, shown in FIG. 1C, is the familiar horseshoe or shark fin shaped chromaticity diagram. It is noted that the red (700 nm) and blue (400 nm) endpoints are joined by a straight-line representing purple, which cannot be presented by a single wavelength, but can be made by combining blue and red.

The Wright and Guild color matching functions were sufficiently similar to each other that when they were graphed on a common set of primaries, the two sets could be averaged with each other. The color matching functions can be written as a rectangular matrix with three columns representing the three monochromatic color primaries and forty-three rows comprising the intensities of the reference white at each 10 nm wavelength passbands in the visible electromagnetic spectrum or about 360 nm to 780 nm. By rows, the color-matching functions are tristimulus values of the plurality of wavelength passbands in the reference white, and by columns they are the response functions of the human observer to the plurality of passbands in the reference white.

The color matching experiment mixes various intensities of the color primaries, which are assigned the value unit of sensation, to match the colors at each 10 nm wavelength interval on the visible electromagnetic spectrum. This experiment provided the RGB sensation values at each 10 nm wavelength interval. The three color primaries were thought of as being orthogonal to each other. Orthogonality would make the color matching functions' transpose its inverse. Orthogonality defines the tristimulus integration as $$Q=A'N, \qquad (1)$$

where Q is a set of tristimulus values [3×1 matrix],

A is the color matching functions [43×3 matrix],

A' is the transpose of A, i.e., the interchange of rows for columns and columns for rows [3×43 matrix], and N is the color stimulus function, preferably the reference white color, [43×1 matrix].

Equation (1) was adopted by CIE for tristimulus integration in spite of the lack of orthogonality of the matrix A.

Practical applications of the color matching functions were limited by the orthogonality assumption in the field of color science, and by the limited understanding of linear algebra at the time of the 1931 CIE system of colorimetry. For example, at this time period, an inverse of a rectangular matrix was not yet understood.

Another hindrance to field of color science is the perceived non uniformity of the three-dimensional color space, such as the CIEL*a*b* color space illustrated in FIGS. 1D and 7. As discussed below, in 1976 CIE proposed a formulation to calculate a color difference $\Delta E^*_b$ (or color distance) between two colors that resemble the Pythagorean theorem or classic Euclidean distance formula. In 1994, CIE had to update this color difference formulation to $\Delta E'_{94}$ to include weighing factors for lightness, chroma and hue values. In 2000, CIE had to yet again update the color difference formulation to $\Delta E^*_{00}$ to be a complex calculation to add yet more weighing factors to compensate for the non-uniformity of the CIEL*a*b* color space with respect to small color differences.

Hence, there remains a need to develop an improved system of colorimetry and applications utilizing same. There are also needs to simplify the color difference formulation and to develop a substantially uniform large color difference color space.

SUMMARY OF THE INVENTION

Hence, the improved invention is directed to an improved system for colorimetry having substantially uniform color space.

The present invention is also directed to a transformation or a system of transformations from an existing non-uniform color space to a novel uniform color space.

The invention is also directed to a novel system of colorimetry where an accurate color difference between any two colors can be readily calculated by a square root of the sum of the squares in uniform color space.

These and other objects of the present invention are realized by a method for organizing a substantially uniform system of colorimetry comprising the steps of (i) taking a pseudoinverse of a matrix containing intensity values for an existing non-uniform color-matching functions;

(ii) empirically determining an opponency transformation matrix based on a plurality of substantially uniformly spaced color standards;

(iii) transforming the matrix from step (i) to a color opponency color coordinate utilizing the opponency transformation matrix from step (ii) to obtain a Red-Green, Yellow-Blue and Lightness (RG, YB and LT) color matching functions; and (iv) transforming the RG, YB and LT color matching functions from step (iii) non-linearly to color matching functions that produce colors recognizable as being uniform by human vision;

wherein after step (iv) the existing non-uniform color matching functions are transformed into substantially uniform color matching functions.

Preferably, the existing color matching functions are the 1964 CIE RGB (red, green and blue) color matching functions.

Preferably, the method further comprises a step of normalizing the pseudoinverse matrix from step (1).

Preferably, the normalizing step the area under each color-matching function is substantially equal to each other.

Preferably, the plurality of substantially uniformly spaced color standards is selected at substantially similar lightness values.

Preferably, the coordinates of the plurality of substantially uniformly spaced color standards are chosen to be uniform.

Preferably, step (iii) includes an iterative step of ensuring uniformity of the substantially uniform color matching function by plotting the RG, YB and LT color matching functions and adjusting the spacing between lines of equal differences in values, if necessary.

Preferably, step (iv) utilizes a Munsell's $5^{th}$ order function.

Preferably, after step (iv) the RG and YB color matching functions are expressed as RG and YB color matching functions as units of chroma.

Preferably, a color difference between two colors is calculated using the square root of the sum of squares in said substantially uniform system of colorimetry.

The present invention is also directed to a substantially uniform system of colorimetry, preferably a substantially uniform system of colorimetry utilizing the methods and preferred methods described and claimed herein.

BRIEF DESCRIPTION OF THE DRAWINGS

In the accompanying drawings, which form a part of the specification and are to be read in conjunction therewith and in which like reference numerals are used to indicate like parts in the various views:

FIG. 8 is a graph using Newton's method discussed in the Appendix.

DETAILED DESCRIPTION OF THE PREFERRED EMBODIMENTS

Figure 1A:
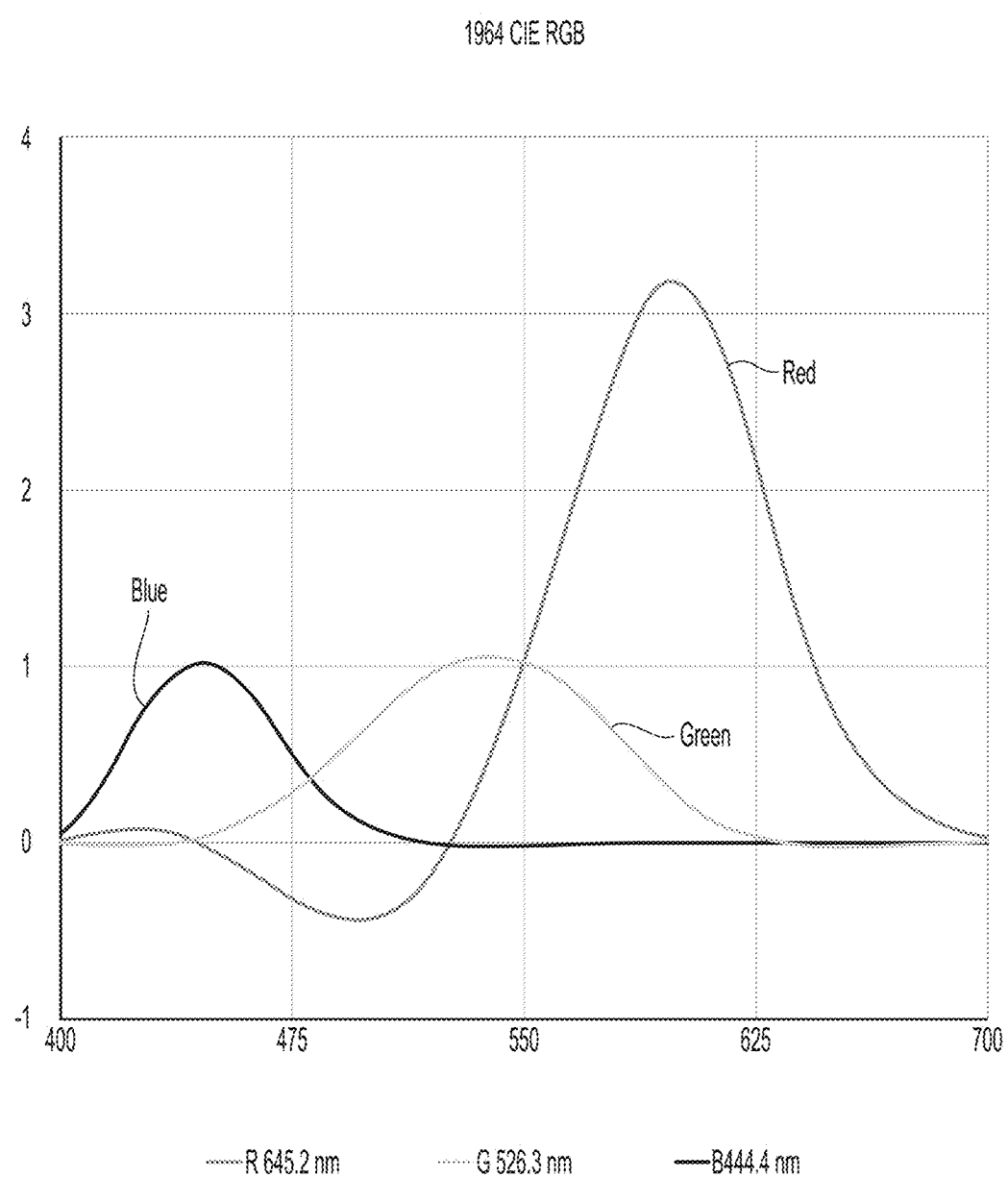
FIG. 1A is the 1964 CIE RGB functions plotted between 400 and 700 nm, taken from 10 nm interval tables.
Figure 1B:
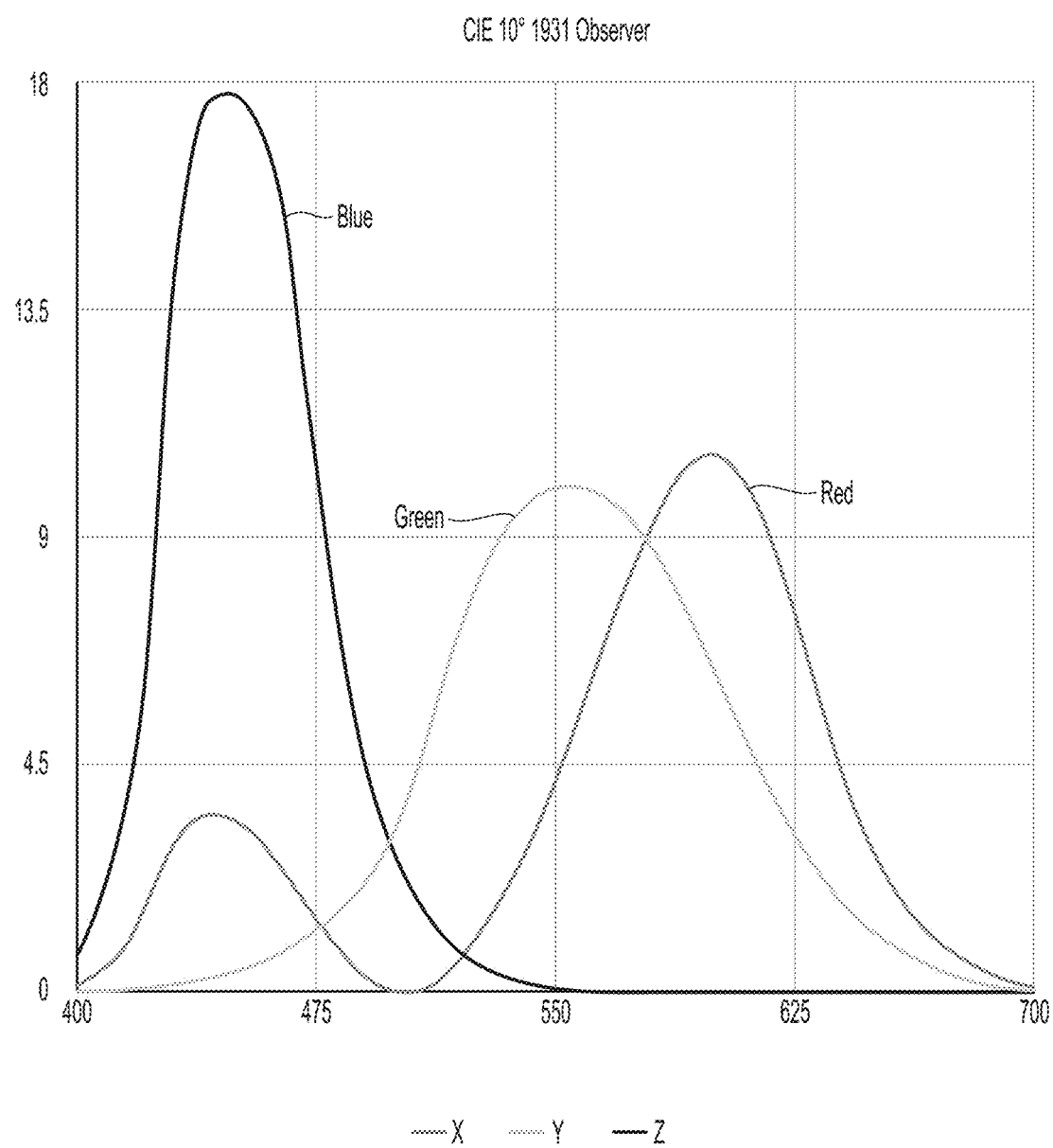
FIG. 1B is FIG. 1A transformed into $\bar{x}, \bar{y}, \bar{z}$ color matching functions.
Figure 1C:
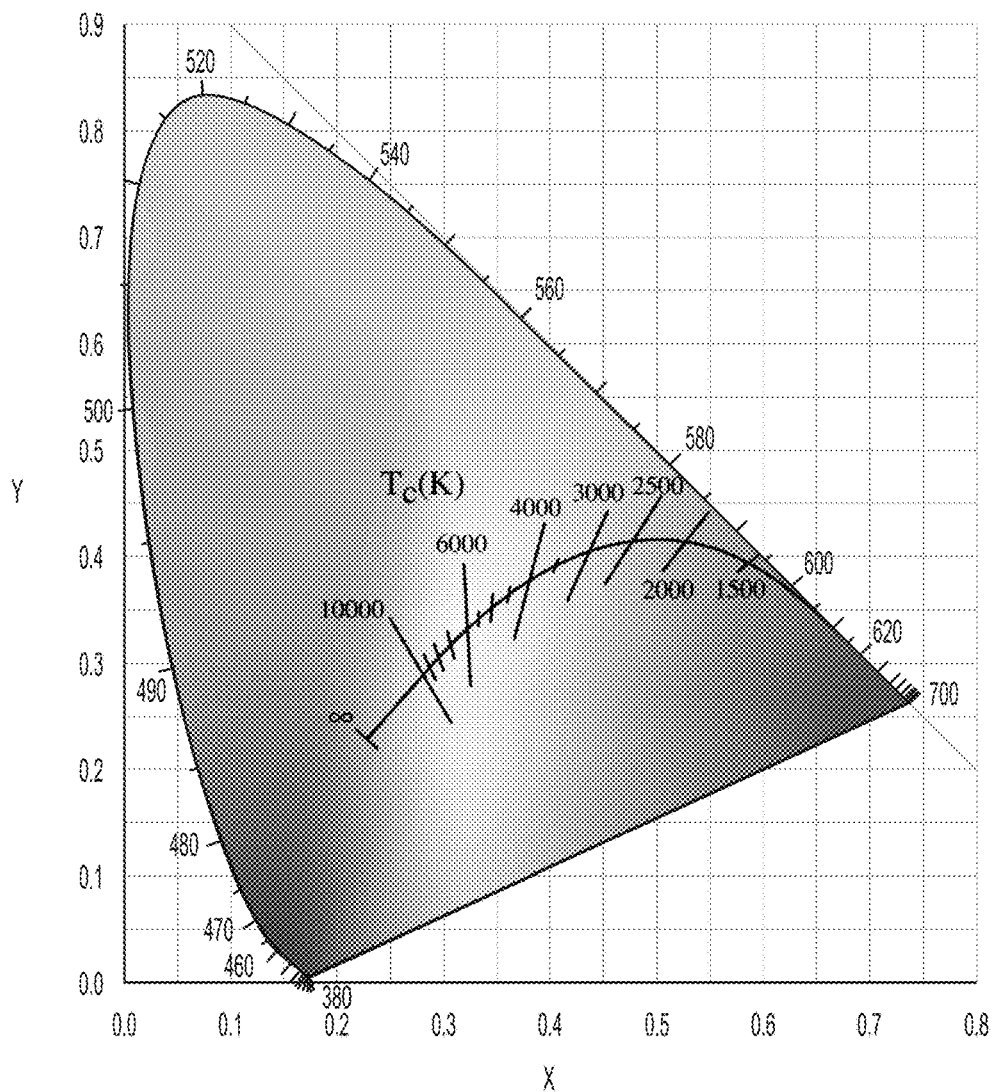
FIG. 1C is the 1931 xy CIE chromaticity diagram.

The angles between the axes of the primaries illustrated in the chromaticity diagram shown in FIG. 1C are not orthogonal, as discussed above. For the present invention and analysis, the present inventors selected the 1964 CIE RGB data from the color matching functions, as illustrated in FIG. 1A, as the starting point for the [3×43] matrix A.

The present inventors have devised a plurality of transformation matrices to be applied to or multiply into the matrix A. It is understood that multiple transformation matrices can be multiplied together or combined with each other to create a single transformation matrix, and the present invention covers both scenarios. Hence, $$A \cdot T = A \cdot T_1 \cdot T_2 \cdot T_3 \quad (2.0)$$

where T is a combined transformation matrix, and

T can also be $T_1 \cdot T_2 \cdot T_3$, or two, three or more transformation matrices.

Matrix $T_1$ inverts or more accurately pseudo-inverts A. Since A is a rectangular matrix, $A \cdot T_1 = A^+$, which is a pseudo-inverse of A. The Moore-Penrose Pseudoinverse is fully described in Penrose R. A, Generalized Inverse for Matrices. *Proceedings of the Cambridge Philosophical Society* 51, 406-413, (1955). Although the pseudoinverse was earlier discussed in Moore E. H. "On the reciprocal of the general algebraic matrix," *Bull. Amer. Math. Soc.* 26, 394-395, (1920), pseudoinverse was not fully understood until 1955 with the publication of the Penrose paper and the pseudoinverse technique was thus later named Moore-Penrose Pseudoinverse.

The Moore-Penrose Pseudoinverse is generally known at the present time. A summary of this technique is presented here. For square matrices, $A(n \times n)$, $A_{-1}(n \times n)$ is its inverse if and only if $A \cdot A^{-1} = I$, where I is the identity matrix. For a rectangular matrix $A(m \times n)$, $A^+$ is its pseudoinverse if and only if the following are true:

$$A^+ = (A' \cdot A)^{-1} \cdot A',$$

where A' or $A^T$ is the transpose of A. It is noted that $A' \cdot A$ would be a [3×3] matrix and its inverse is readily calculatable.

A matrix $T_1$ that transforms A to $A^+$ was calculated to be

| | | |
|---|---|---|
| 0.02101 | −0.02243 | 0.00555 |
| −0.02243 | 0.15725 | −0.02051 |
| 0.00555 | −0.02051 | 0.25222, |

Figure 2:
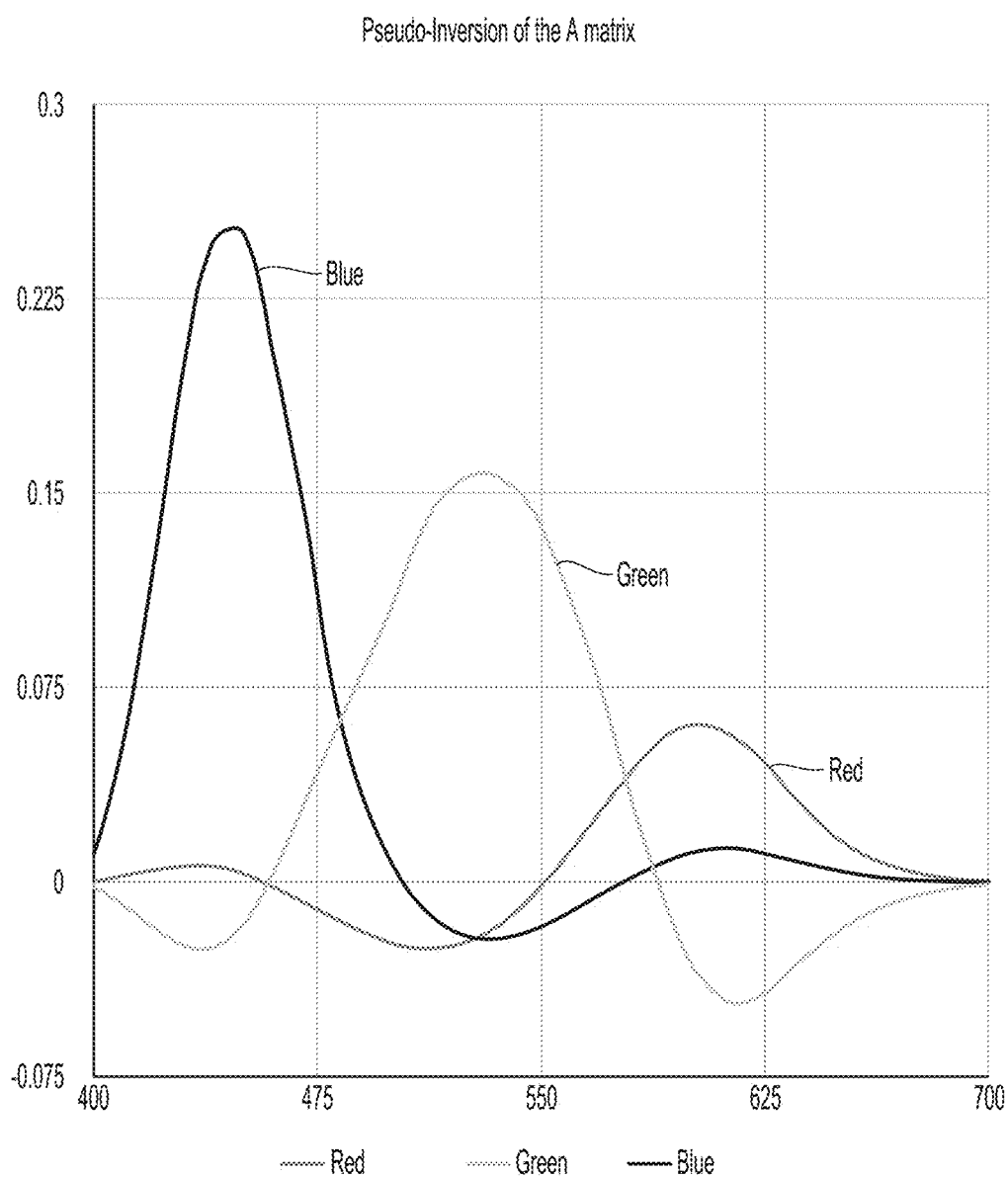
FIG. 2 illustrate the pseudoinverse of the Red, Green, and Blue color matching functions in FIG. 1A.

And the color matching functions of FIG. 1A are transformed to those illustrated in FIG. 2.

Figure 3:
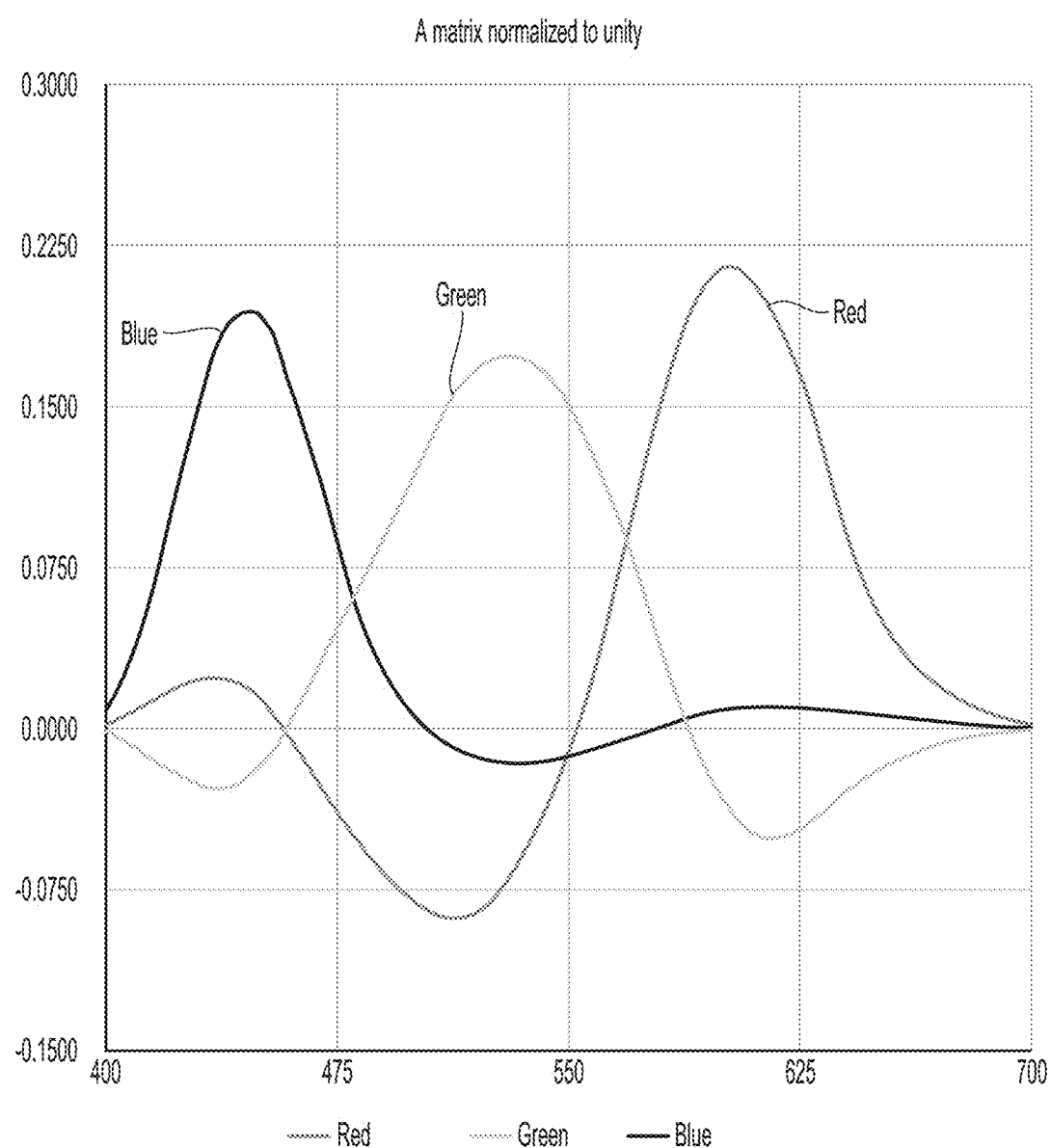
FIG. 3 shows the normalized pseudo-inversion of the functions in FIG. 2.

The curves illustrated in FIG. 2 have areas under them that are different from each other. An integration of the blue chromatic curve would be about three times farther away from the neutral axis as the red curve. Preferably, the next transformation matrix, $T_2$, should equalize the areas under these curves. Hence, $A \cdot T_1 \cdot T_2$ is illustrated in FIG. 3, which shows that integration under each curve would yield substantially the same area.

A matrix $T_2$ was calculated to be

| | | |
|---|---|---|
| 3.5296 | 0.0000 | 0.0000 |
| 0.0000 | 1.0987 | 0.0000 |
| 0.0000 | 0.0000 | 0.7644 |

$T_2$ represents a scaling matrix with non-zero values occupying the diagonal of the matrix.

The next transformation matrix, $T_3$, is designed to transform $A \cdot T_1 \cdot T_2$ into color opponency. Some colors can be perceived simultaneously, such as red and yellow (orange), red and blue (purple), green and blue, yellow and green, etc. However, some combinations cannot be perceived simultaneously, such as red and green, and yellow and blue. One cannot see reddish green or yellowish blue. The German physiologist Ewald Hering hypothesized that humans have color opponency processes: red-green, and yellow-blue. In other words, these color pairs cannot be perceived simultaneously. These opponency pairs are plotted as the CIE L*a*b* plot illustrated in FIG. 1D with Lightness or black-white (L*) as the third axis.

The three equations are expressed in terms of R, G and B as follows:

$$RG = t_{11}R + t_{12}G + t_{13}B$$

$$LT = t_{21}R + t_{22}G + t_{23}B \text{ (black-white or lightness)}$$

$$YB = t_{31}R + t_{23}G + t_{33}B$$

$T_3$ which is the opponent transformation therefore is:

$$T_3 = \begin{matrix} t_{11} & t_{12} & t_{13} \\ t_{21} & t_{22} & t_{23} \\ t_{31} & t_{23} & t_{33} \end{matrix}$$

However, as discussed above, the RGB primaries do not produce uniformity. Interpolating between adjacent or nearby colors that have unequal spacing would yield less than useful values and colors.

According to one embodiment of the invention, $T_3$ is solved empirically using colors or color standards that have colors with equal spacing with known XYZ values, as well as spectral values. In one example, a plurality of color standards having substantially equal values of lightness is selected to have substantially uniform spacing among them. These color standards can be chosen by color experts or selected from existing industry accepted color libraries. In this example, n # of uniformly spaced or substantially uniformly spaced colors having the same or similar lightness values are selected and their spectral values are measured to have 43 values at 10 nm intervals. It is noted that the n # uniformly spaced colors do not need to originate in actual colors at these coordinates. Their coordinates are chosen to be uniform. These color standards are written as M (43×n) matrix. Returning to Equations. (1.0) and (2.0)

$$Q = A' \cdot N, \quad (1.0)$$

$$A \cdot T = (A \cdot T_1 \cdot T_2 \cdot T_3) \quad (2.0)$$

Let $E = A \cdot T_1 \cdot T_2 \cdot T_3,$ then $Q = E' \cdot N. \quad (3.0)$

Since A is a (3×43) matrix and each of $T_1$, $T_2$, $T_3$ is a (3×3) matrix, E is a (43×3) matrix. E' is a (3×43) matrix. E is the inventive color matching functions of the system of colorimetry of the present invention.

To empirically solve for $T_3$, Q is replaced by P (3×n) which has the tristimulus values of the n # color standards chosen to be uniform, and N is replaced by M. The values of P and M are known from the chosen/selected uniform color set. Hence, equation (3.0) can be re-fashioned, as follows, for n # uniformly spaced colors to solve for $T_3$.

$$P = E' \cdot M \quad (3.1)$$

or $P = (A \cdot T_1 \cdot T_2 \cdot T_3)' \cdot M$

All values in equation (3.1) are known, except for $T_3$. Hence, T can be solved using empirical uniform color standards and their tristimulus and spectral data.

In another non-limiting example, color standards from the Optical Society of America (OSA)'s color atlas were chosen due to their widely acceptance in the field of color science for their uniformity. The OSA atlas contains about 558 colors with known XYZ values, as well as, spectral values. Any subsets from the OSA color atlas, preferably from a same lightness plane, can be selected.

Solving for $T_3$ yields:

$$T_3 = \begin{bmatrix} 2457.2 & 35.247 & 2246.6 \\ -2800.0 & 59.068 & 2983.5 \\ 114.29 & 5.6869 & -4612.7 \end{bmatrix}$$

Figure 4:
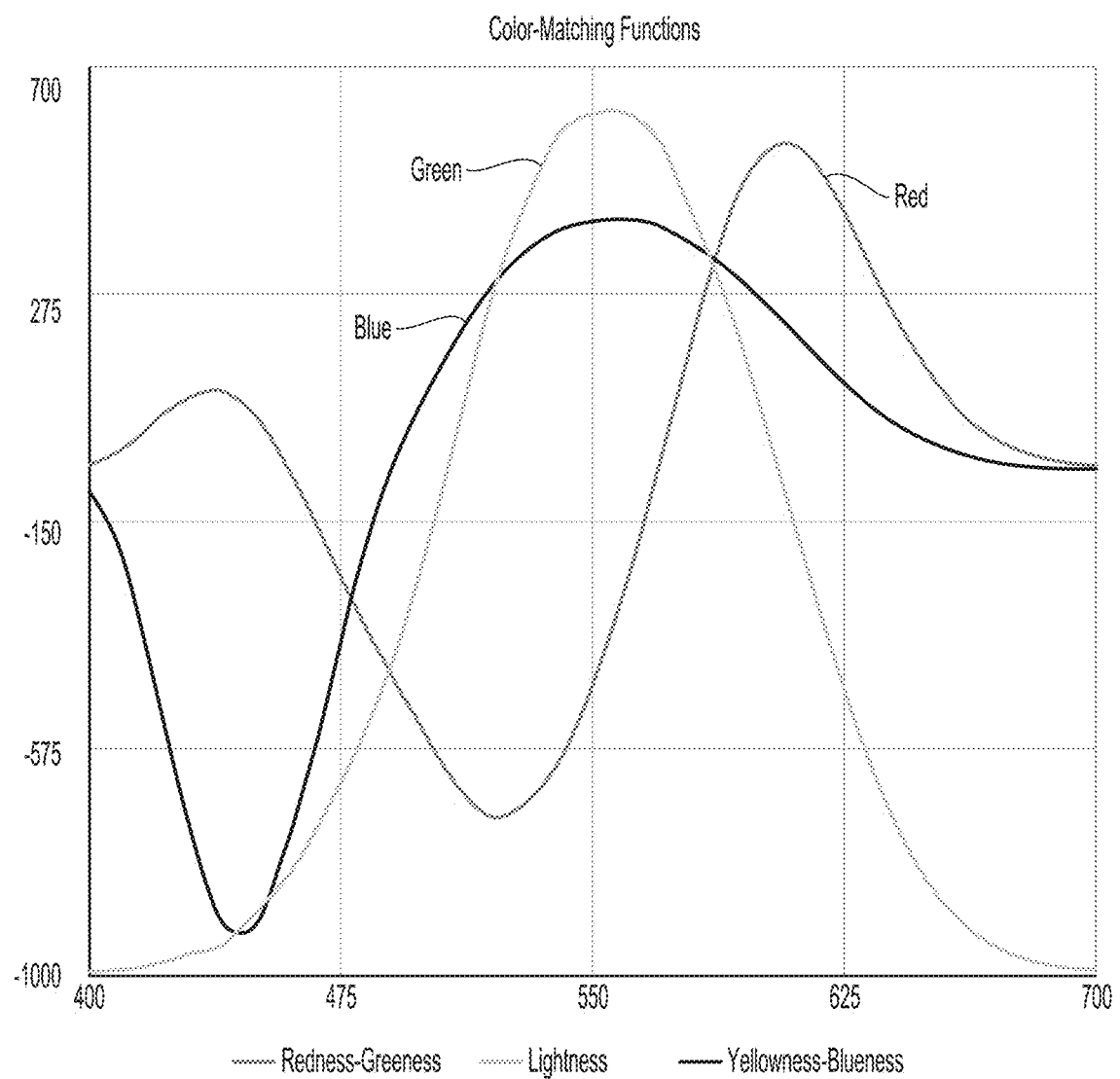
FIG. 4 shows the color-matching functions Redness-Greeness (RG), Yellowness-Blueness (YB) and Lightness (LT or BW).

$T_3$ when multiplied to $A \cdot T_1 \cdot T_2$, which is illustrated in FIG. 3, yields the inventive color-matching functions Redness-Greeness (RG), Yellowness-Blueness (YB) and Lightness (LT), as shown in FIG. 4. The scales on the right and left vertical sides of FIG. 4 are the scales chosen by the present inventors. The right-hand-side scale is from 0 to 10.0 and represents Lightness (LT) and the left-hand-side scale ranges from −1500 to +1000 to better fit the calculated values of RG and YB.

With $T_1 \cdot T_2 \cdot T_3$ solved and $E = A_1 \cdot T_2 \cdot T_3$, equation (3.0) can now be used to position colors on a uniform color space. Uniform color space can be carried out using the RG, YB and LT color matching functions, shown in FIG. 4.

Equation (3.0) is written in a simplified form based on the nomenclature used by J. B. Cohen), as follows:

$$Q = E' \cdot N \qquad (3.0).$$

where $$Q = \begin{bmatrix} RG \\ LT \\ YB \end{bmatrix}$$

Equation (3) is comparable to Equation (1), except that the inventive color matching function E or its transpose E' replaces the 1964 A matrix and its transpose A'. The columns of E are rewritten as RG, LT, YB to distinguish these uniform color-matching functions from nomenclature used in the CIEL*a*b* system of colorimetry to avoid possible confusion. The numerical data from FIG. 4 is written into RG, LT and YB functions using the scales shown therein, is shown below in Table 1.

TABLE 1

Color-matching functions of the inventive system from 360 nm to 780 nm at 10 nm intervals.

| Wavelength | Functions | | |
|---|---|---|---|
| | RG | Lightness | YB |
| 360 nm | 0.000 | 0.000 | 0.000 |
| 370 | 0.000 | 0.000 | 0.000 |
| 380 | 0.225 | 0.000 | −0.756 |
| 390 | 1.476 | 0.002 | −5.711 |
| 400 | 9.271 | 0.010 | −36.872 |
| 410 | 40.915 | 0.036 | −166.743 |
| 420 | 99.154 | 0.083 | −430.100 |

TABLE 1-continued

Color-matching functions of the inventive system from 360 nm to 780 nm at 10 nm intervals.

| Wavelength | Functions | | |
|---|---|---|---|
| | RG | Lightness | YB |
| 430 | 144.265 | 0.181 | −705.819 |
| 440 | 156.888 | 0.281 | −899.11 |
| 450 | 101.919 | 0.607 | −904.077 |
| 460 | −2.951 | 0.984 | −724.433 |
| 470 | −139.643 | 1.555 | −490.464 |
| 480 | −281.616 | 2.224 | −206.177 |
| 490 | −405.164 | 3.027 | −4.423 |
| 500 | −523.116 | 4.113 | 141.565 |
| 510 | −627.363 | 5.394 | 265.654 |
| 520 | −689.966 | 6.727 | 366.121 |
| 530 | −662.521 | 7.622 | 431.433 |
| 540 | −581.397 | 8.334 | 477.930 |
| 550 | −430.18 | 8.530 | 493.813 |
| 560 | −232.343 | 8.547 | 498.439 |
| 570 | 8.337 | 8.269 | 485.999 |
| 580 | 262.274 | 7.508 | 445.725 |
| 590 | 488.221 | 6.714 | 402.998 |
| 600 | 620.570 | 5.640 | 342.038 |
| 610 | 648.336 | 4.482 | 274.438 |
| 620 | 575.628 | 3.346 | 206.361 |
| 630 | 447.386 | 2.327 | 144.259 |
| 640 | 309.819 | 1.501 | 93.219 |
| 650 | 198.033 | 0.914 | 56.900 |
| 660 | 113.238 | 0.510 | 31.78 |
| 670 | 61.347 | 0.271 | 16.936 |
| 680 | 31.346 | 0.138 | 8.603 |
| 690 | 15.090 | 0.066 | 4.101 |
| 700 | 7.285 | 0.032 | 2.005 |
| 710 | 3.466 | 0.015 | 0.951 |
| 720 | 1.611 | 0.008 | 0.470 |
| 730 | 0.805 | 0.004 | 0.235 |
| 740 | 0.428 | 0.002 | 0.125 |
| 750 | 0.227 | 0.001 | 0.066 |
| 760 | 0.126 | 0.001 | 0.037 |
| 770 | 0.050 | 0.000 | 0.015 |
| 780 | 0.000 | 0.000 | 0.000 |
| CS | −228.524 | 100.008 | 617.531 |
| WP | −228.525 | 100.005 | 617.530 |

The sums marked CS are a checksum of the actual digits presented to assist users in transcribing the data. The sums marked WP are the analytical white points to be used in transformations to other systems and in formulas requiring the neutral point.

While chroma and saturation are often used interchangeably, CIE defined these two concepts to be distinct from each other. "Colorfulness" is the attribute of a visual perception according to which the perceived color of an area appears to be more or less chromatic. "Saturation" is the colorfulness of area judged in proportion to its brightness. "Chroma" is the colorfulness of an area judged as a proportion of the brightness of a similarly illuminated area that appear white or highly transmitting. (See e.g., https://munsell.com/color-blog/difference-chroma-saturation/).

Figure 1D:
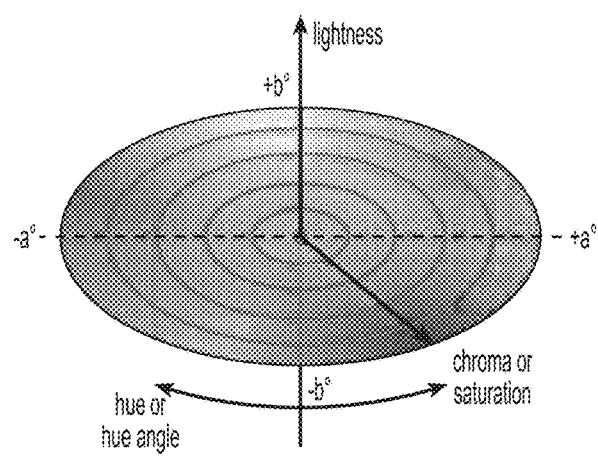
FIG. 1D is an illustration of a CIE L*a*b* color space.

A visual description of chroma and saturation is illustrated in connection with the CIEL*a*b* graph shown in FIG. 1D. A line connecting the point where L*=0 (black) on the bottom of the L* axis to any selected color represents a line of constant saturation. In other words, colors falling on that line would have the same saturation as a selected color on that line. Lines that are parallel to the L* axis and intersect the constant saturation line are lines of constant chroma. In other words, colors falling on each of the parallel lines would have the same chroma.

The RG, LT, and YB functions can be used to double-check or to ensure that the $T_3$ matrix's transformation was uniform. The RG, LT, YB values can be plotted on a Cartesian coordinate with RG (redness-greenness) and YB (yellowness-blueness) on a horizontal plane and LT (lightness) on a vertical plane. Lines of equal numerical distance from each other for each axis when plotted should appear visually as lines of equal distance from each other. If not, then the values of $T_3$ can be adjusted. For example, if the plot shows that RG lines of equal numerical distance are not parallel to each other, then the values in $T_3$ that correspond to RG can be adjusted, and the RG, LT, and YB values can be replotted to ensure that lines of equal numerical values would yield lines of equal visual distances. The values of the $T_3$ matrix reported above have been plotted and double-checked using this technique.

While all transformations described thus far have been linear transformations utilizing linear algebra, the human vision system, in additional to color opponency, also makes a non-linear transformation before rendering the final appearance of colors that is recognized as being uniform by people's vision. This non-linear transformation takes into account the non-linear relationship for lightness (L) and a quasi non-linear relationship for the chromatic axes of the color system, namely between chroma and saturation. The functions in equation (3) can be transformed utilizing the Munsell's $5^{th}$ Order function, which is widely accepted to be uniform when the background is approximately equal to the specimen being viewed in lightness. The Munsell's $5^{th}$ Order function is described in S. M. Newhall, D. Nickerson and D. B. Judd, "Final Report of the OSA Subcommittee of the Spacing of the Munsell System," J. Opt. Soc. Am., 3, 385-418, 1943. Implementation of an inverse to Munsell's $5^{th}$ Order function is described in ASTM E1535 Standard Practice for Specifying Color by the Munsell System.

The inverse Munsell $5^{th}$ Order transformation yields the following lightness function and the chromatic functions follow as part of the inventive process:

$$LT = 20.583 A^{0.3655} - 10.792$$

$$RG_c = RG_s/LT + 0.479 \quad (4)$$

$$YB_c = YB_s/LT - 2.12$$

As used herein, the subscript "s" denotes saturation and the subscript "c" denotes chroma.

LT, RGc and YBc are the inventive uniform color matching functions in accordance to the present invention, wherein each of the inventive function has a scalar offset added or subtracted therefrom. The present inventors note that equations (4) express the relationship between the RG and YB functions at units of chroma derived from the tristimulus values of eq. (3) whose values are stated in units of saturation.

Other non-linear transformations can be utilized and are shown in the attached Appendix.

EXAMPLE: Twenty-five (25) colors are selected to be near the neutral point, which is a gray point with zero chroma. These colors are chosen at 2.5 units of notation differences in the inventive color system. Their notations are inverted to tristimulus values and their fundamental stimulus functions are found by matrix R theory, as explained by J. B. Cohen.

$$N^* = (E'E)^{-1} E^{-1} \cdot Q \quad (5)$$

where $E = A \cdot T_1 \cdot T_2 \cdot T_3$, and where $N^*$ is the fundamental of N. A fundamental of a matrix is a way of getting a spectrum with the tristimulus values of the color having tristimulus values Q from the tristimulus information only. In other words, it goes from dimensionality 3×1 to 43×1. The fundamental of color matrices is explained in J. B. Cohen. The advantages of using fundamentals is explained in H. S. Fairman, "The Fundamental Theorem of Tristimulus Integration," Color Res. Appl. 2019 (Aug. 8, 2019), which is incorporated herein by reference in its entirety.

Figure 5:
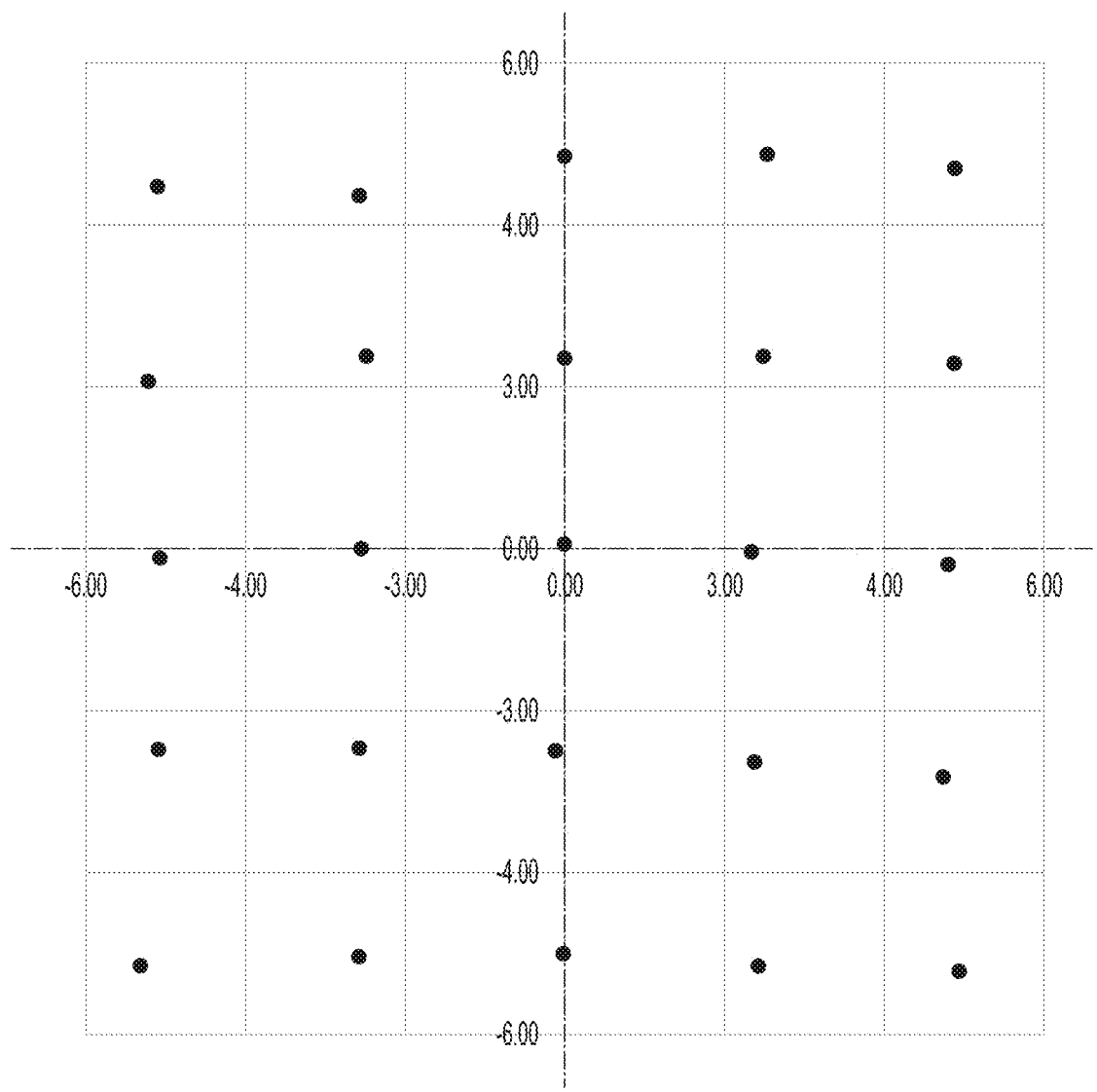
FIG. 5 is a plot of 25 evenly spaced colors in the inventive uniform color space.

The 25 colors are produced by matching their fundamental spectra as first-cuts under a conventional computer color-matching regime. The colors are chosen as 2.5 units of notation differences in the inventive system of colorimetry. The color samples are then measured, integrated, and plotted in the inventive system for colorimetry, as shown in FIG. 5. FIG. 5 shows the substantial uniformity of the inventive system for colorimetry. These color samples were mounted on a display and recognized by the co-inventors and a colleague, who agreed with their uniformity.

Figure 6:
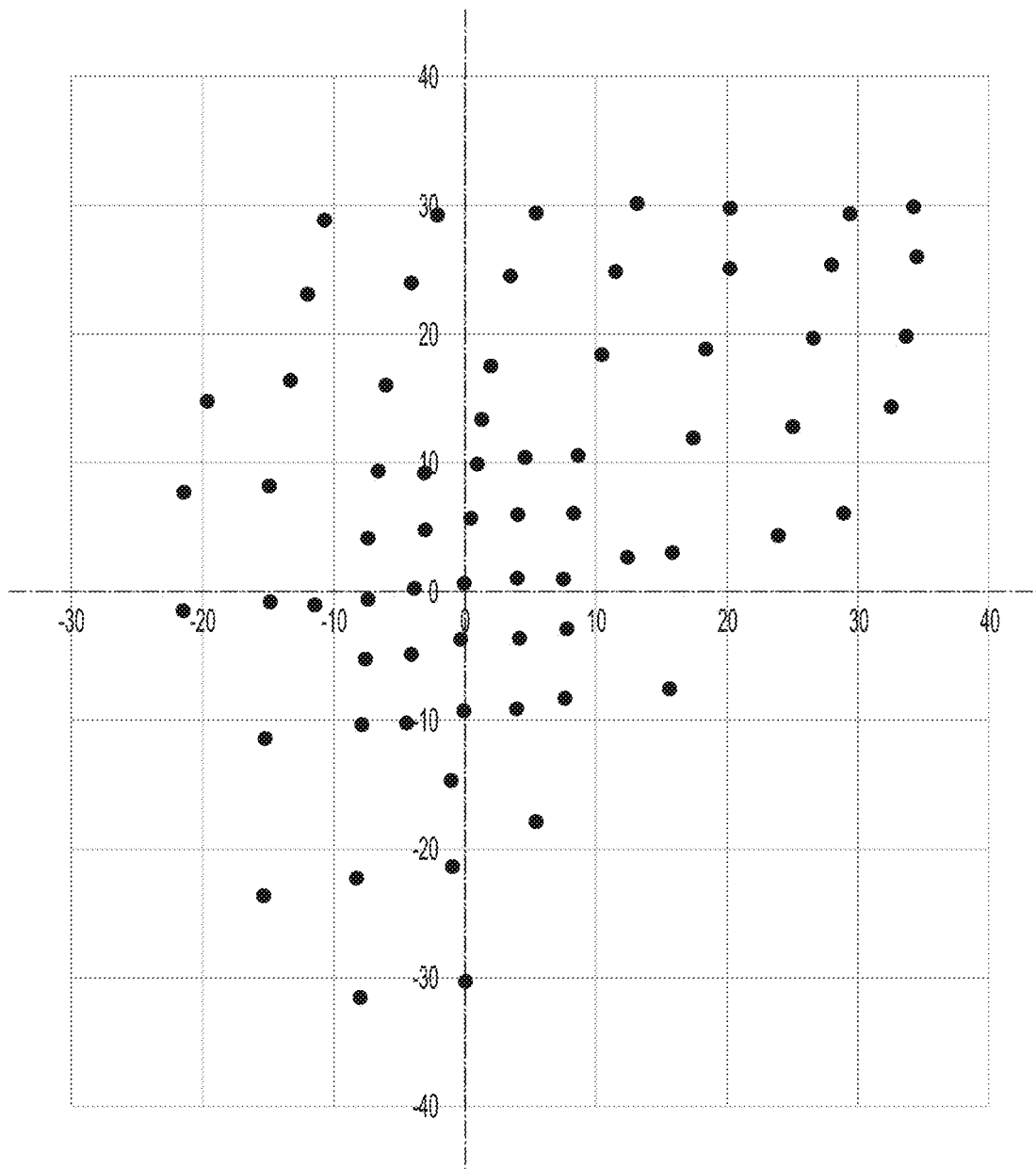
FIG. 6 is a plot of the colors from the OSA Atlas at L=0 plane.

As discussed above, the OSA atlas of colors is considered by color scientists to be the system that maximizes large-scale color-difference uniformity. The OSA atlas was specifically created by a panel of color experts to be large-scale uniform. Color chips from the L=0 plane from the OSA atlas are selected and measured and integrated in the inventive system for colorimetry. The resulting notations for these colors, which are different than the 25 colors shown in FIG. 5, are plotted on FIG. 6. It is noted that the scale for FIGS. 5 and 6 are different from each other. In FIG. 6, when the units are 10, i.e., within the center four squares, the OSA colors are also shown as uniform utilizing the inventive system of colorimetry.

The present inventors also note that many systems for colorimetry place red and green, and yellow and blue 180° opposite each other. That arrangement is still in use today in the CIE System for Colorimetry, whose primary uses are for control and reproduction of color. Artist's systems for colorimetry have, more recently, tended to display the unique primary colors red, blue and green at about 120° from each other in the hue circle. It is interesting that the inventive system for colorimetry has the unique red, green and blue colors at about 120° from each other, because if complimentary pairs of colors are to adhere to the definition of complementariness that their reflected light should sum to a white light, then a primary color cannot be complimentary to another primary. A secondary color should compliment a primary, because there are three sensitivity bands to be fulfilled to make white light and two primaries could only fulfill two of them at any one time. This is useful, because prediction of colors that are harmonious with each other are based upon the positions of colors in the hue circle of color space, and harmony and emotion generated by various colors is a field presently growing in importance in colorimetric analysis.

Figure 7:
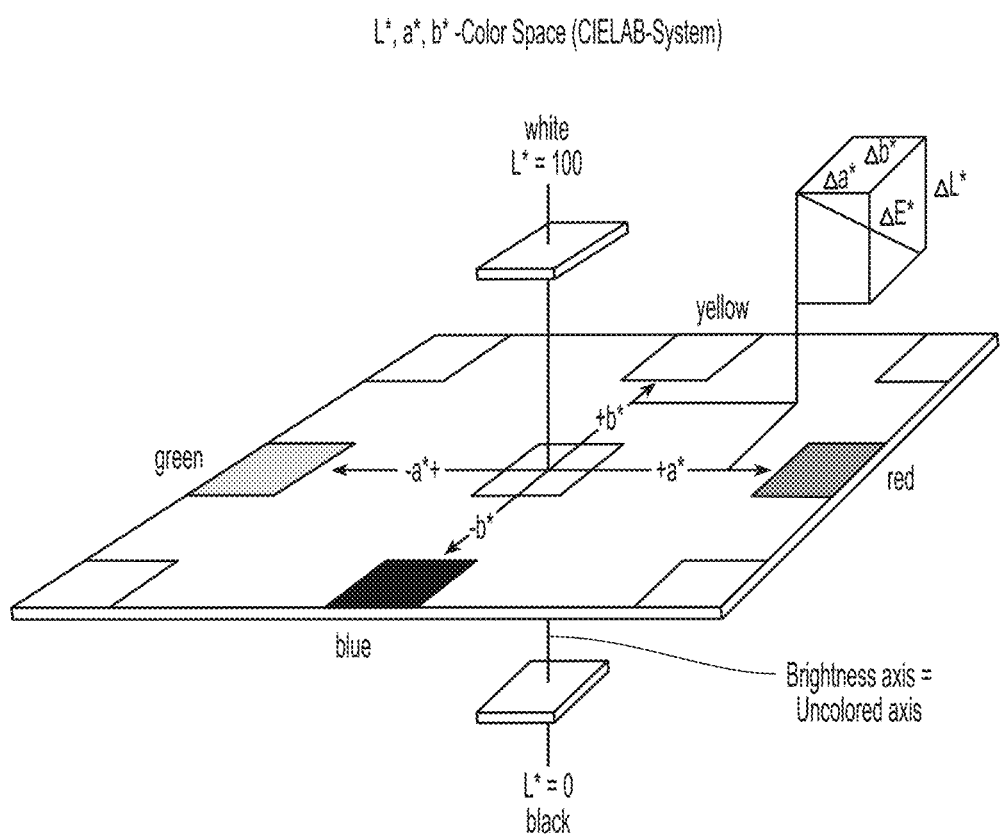
FIG. 7 is another illustration of a CIE L*a*b* color space showing a simple color difference calculation based on the square root of the sum of the squares (Pythagorean type).

In accordance to another aspect of the present invention, color difference calculation between any two colors can be improved utilizing the inventive system of colorimetry. A 1976 CIE color difference between two colors is based on the known Pythagorean distance calculation, the classical Euclidian distance formulation or the square root of the sum of squares, which is illustrated in FIG. 7, and can be expressed as follows:

$$\Delta E^*_{ab} = \{(L_2-L_1)^2 + (a^*_2-a^*_1)^2 + (b^*_2-b^*_1)^2\}^{1/2}.$$

In 1994 CIE published an improved color difference based on the L*C*h* coordinates (Lightness, chroma and hue) and weighing factors, k and S, based on the application, e.g., graphic arts or textiles.

$$\Delta E^*_{94} = \{(\Delta L^*/[k_L S_L])^2 + (\Delta C^*/[k_C S_C])^2 + (\Delta h^*/[k_H S_H])^2\}^{1/2}.$$

Since the 1994 CIE color difference did not fully address the non-uniformity issue, in 2000 CIE refined the color difference equation CIEDE2000 as follows:

$$\Delta E_{00}^* = \sqrt{\left(\frac{\Delta L'}{k_L S_L}\right)^2 + \left(\frac{\Delta C'}{k_C S_C}\right)^2 + \left(\frac{\Delta H'}{k_H S_H}\right)^2 + R_T \frac{\Delta C'}{k_C S_C} \frac{\Delta H'}{k_H S_H}}$$

with corrections for hue in the blue regions, neutral colors ('), lightness ($S_L$), chroma ($S_C$) and hue ($S_H$). See Sharma G., Wu W. and Dalal E. "The CIEDE2000 Color-Difference Formula: Implementation Notes, Supplementary Test Data, and Mathematical Observations," published in COLOR Research and Application, Vol. 30, No. 1, February 2005, pp. 21-30.

The complexities of correcting the color difference equations to handle the non-uniformity of the colorimetry system are readily apparently from the simple 1976 color difference to the CIEDE2000.

In accordance to another aspect of the present invention, the Euclidean or the square root of the sum of squares method can be used with the inventive uniform system of colorimetry. The color difference between any two colors can be accurately determined. The complexities illustrated in the CIE color difference equations are obviated. In other words, the simpler 1976 $\Delta E^*_{ab}$ color difference equation can be used with the inventive system of colorimetry to calculate satisfactory color differences between two colors and to interpolate the two colors.

The present inventors note that the magnitude of the color difference calculation using the inventive system of colorimetry is not directly comparable with the three existing color difference calculations provided by CIE, because the present color differences are based on substantially uniform axes, while the CIE color difference calculations are not. Furthermore, the scale or units of the inventive system of colorimetry are different than those of the CIE systems of colorimetry. The present inventors also note that color differences calculated with the CIE 1976, 1994 and 2000 equations also have different units and each color difference calculation must be designated as $\Delta E^*_{ab}$, $\Delta E^*_{94}$ or $\Delta E^*_{2000}$.

Other practical applications of the novel methods and inventive system of colorimetry described and claimed herein will be understood by those of ordinary skills in the art.

In another embodiment, $T_2$ matrix can be omitted. The $T_3$ matrix when solved empirically would include the values of $T_2$.

Another modification is that the starting point of the inventive method can be other than the 1964 CIE RGB data. Another data set, such as the 1931 CIE RGB data, could be selected. Again, solving $T_3$ empirically could take into account a different starting point.

Due to the complexities of the linear algebra described herein, it is most preferred that the calculations are performed by a computing device, a microprocessor or the like.

While it is apparent that the illustrative embodiments of the invention disclosed herein fulfill the objectives stated above, it is appreciated that numerous modifications and other embodiments may be devised by those skilled in the art. One such modification is that coefficients $t_{11}$, $t_{12}$ ... $t_{33}$ of $T_3$ can also represent $T_1 \cdot T_2 \cdot T_3$, albeit with different values to take into account the coefficients of all the transformation matrices. Therefore, it will be understood that the appended claims are intended to cover all such modifications and embodiments, which would come within the spirit and scope of the present invention.

APPENDIX. SUITABLE NON-LINEAR TRANSFORMATIONS

The Munsell fifth-order function is well known to colorists. It relates Munsell luminous intensity V to CIE Y for the CIE 2° Observer and Illuminant C, the illuminant-observer specification of the Munsell System for color. It may be calculated from $$Y = 1.1914V - 0.22533V^2 + 0.23352V^3 - 0.020484V^4 + 0.00081939V^5. \quad (1)$$

The coefficients of this equation are obtained from the 1943[1] published equation by multiplying each coefficient by 0.975. See S. M. Newhall, D. Nickerson, and D. B. Judd, "Final report of the OSA Subcommittee on the Spacing of the Munsell System," J. Opt. Soc. Am., 33, 385-418, 1943. This accounts for the 1964 change in the reference white for colorimetry from magnesium oxide to the perfect reflecting diffuser.

Because the expression of eq. (1) is a polynomial with terms of five dissimilar orders, the equation has no simple inverse. Simple in this context means that the arithmetical operations utilized are limited to addition, subtraction, multiplication and division, as well as square root, cube root, and simple transcendental functions such as sine, cosine, and tangent.

It should be noted that the CIELAB lightness function $$L^* = 116 \left(\frac{Y}{Y_n}\right)^{\frac{1}{3}} - 16 \quad (2)$$

is an attempt at an inverse to the fifth-order unction.

The need for an inverse arises because most uses for the function will be cases where the tristimulus values are known but notation in a uniform color space is sought.

In the past several years, various functions have been proposed for inversing this relationship, that is, calculating Munsell V, or its analogue, from CIE Y. This appendix discusses four such alternatives.

Newton's Method

The first such alternative is Newton's Method. Newton's method was first published in 1685 in *A Treatise of Algebra both Historical and Practical* by John Wallis, although Newton was said to have taught the method in classes at Oxford from 1669. It is an iterative method which converges quadratically, i.e., the number of accurate digits approximately doubles with each iteration.

The method requires knowledge of the first derivative of the function involved. The Munsell value function has a well-behaved and easy to calculate first derivative, $$f'(V) = 1.1914 - 0.45066V + 0.70056V^2 - 0.081936V^3 + 0.00409695V^4. \quad (3)$$

Referring to FIG. 8, start at a point A on the x-axis. This point denotes an initial approximation of the root $x_1$. Draw a perpendicular to the function $f(x)$ at B. At B, draw the tangent to the x-axis to a new approximation $x_2$. Continue the iterative process until the process converges to the root where the function crosses the x-axis.

To implement this process algorithmically, note that AB equals $f(x_1)$ and AC equals $x_1 - x_2$, so that $$\tan\Theta = \frac{AB}{AC} = \frac{f(x_1)}{x_1 - x_2} \quad (4)$$

but, it is also true that $$\tan\theta = \left(\frac{df}{dx}\right)_{x=x_1}. \quad (5)$$

So substituting eq.(4) into eq.(5) with a small rearrangement, and abbreviating the derivative as $f'(x_1)$, gives $$x_2 = x_1 - \frac{f(x_1)}{f'(x_1)} \quad (6)$$

This is clearly an iterative process wherein $$x - \frac{f(x)}{f'(x)} \xrightarrow{yields} x \quad (7)$$

where the 'yields' arrow indicates that as soon as a new value of x has been calculated it is immediately cycled back to the left-hand side of eq. (7) until the iterative change in x is less than the investigator's needed accuracy and the process may stop.

Pseudo code for implementing Newton's Method is given in an appendix to N. Moroney, H. S. Fairman, P. T. Chong, "An Inverse to the Optical Society of America-Uniform Color System," Color Res. App., 37, 106-108, 2013.

ASTM Function

McCamy published an article which promulgated an equation for inversing of the Munsell fifth-order function. See C. S. McCamy, "Munsell Value as Explicit Functions of CIE Luminance Factor, Color Res. App., 17, 205-207, 1997. The equation was later adopted by ASTM as the inverse in their standard E1535. See ASTM E1535 Standard Practice for Specifying Color by the Munsell System, ASTM International, West Conshohocken, Pa., USA.

The equations are $$\text{for } Y < 0.9: \quad V = UY^W \quad (8)$$

$$\text{for } Y \geq 0.9: \quad V = AY^{1/3} - B - C/[(DY-E)^2 + F] + G/Y^H + \\ J \sin(KY^{1/3} + 1) + (M/Y)\sin[N(Y-2)] - (P/QY)\sin[S(Y-T)] \quad (9)$$

where:
A=2.49268
B=1.5614
C=0.985
D=0.1073
E=3.084
F=7.54
G=0.0133
H=2.3
J=0.0084
K=4.1
M=0.0221
N=0.39
P=0.0037
Q=0.44
S=1.28
T=0.53
U=0.87445
W=0.9967

Simple Inverse

Co-inventor Fairman proposed to ASTM the use of the following equations.

$$\text{For } Y \leq 1.7 \quad L = \frac{17}{2}Y. \quad (10)$$

$$\text{For } Y > 1.7 \quad L = \frac{247}{12}\frac{Y^{\frac{125}{342}}}{Y_n} - \frac{2337}{220}. \quad (11)$$

where Y is the tristimulus value of the perfect reflecting diffuser in the illuminant-observer combination under consideration. This set of equations scales the uniform lightness term L so that L=10V.

Kobayasi Function

In 2013, Kobayasi[5] proposed
for Y<6.25

$$V = 5.6Y/(5.5+Y) \quad (12)$$

for Y>=6.25

$$V = 47Y^{1/2}(37 + Y^{1/2}). \quad (13)$$

See M. Kobayasi, "An Effective Formula for Munsell Lightness Function," Proceedings of 12$^{th}$ AIC Congress, AIC2013, 1449-1452, 2013. The result of this process is once again scaled to Munsell V.

Similarities and Differences

Each of the proposals that are directly calculated from equations involves two equations each covering a different portion of the possible range 0<Y≤100. That the break between the two equations is different in each case is not really a difference but a circumstance arising from the fact that the equations are of differing forms. All three have break points where the two function's values are smooth in transition from one function to the other.

The simple inverse has one feature that accommodates calculation which the other equations could acquire, but which is not present in their original proposals. That is the fact that the coefficients are expressed as fractions. Some programming languages have data types that accommodate fractional coefficients, and may calculate results more accurately than those languages that lack this data type.

Precision and Accuracy Result

Newton's method may be implemented to any degree of precision at the expense of additional run-time. The precision is stated by the user as a parameter and the results are fully accurate to the desired precision. Accordingly, the accuracy of only the three remaining equations need be explored.

The error associated with each remaining equation is listed in the accompanying table. The units of mean error over 1280 locations between V=0.7 and V=9.6 is stated in units of V, so that the errors are in ten-thousandths of a V unit. The number of occurrences over one-hundredth of a V unit and the number of occurrences over two one-hundredths of a V unit are also tabularized.

| Error associated with each equation | | | |
|---|---|---|---|
| | Mean Error | Number > 0.01 | Number > 0.02 |
| McCamy | 0.0020 | 146 | 1 |
| Fairman | 0.0073 | 449 | 29 |
| Kobayasi | 0.0065 | 421 | 28 |

CONCLUSIONS

If accuracy is the only criterion, then the McCamy equation is the more accurate. If the ease of implementation is a criterion, then there is little to choose from between the Fairman and the Kobayasi equations. Likely both are accurate enough for most applications and each may be simply programmed in a spreadsheet, whereas the complexity of the McCamy equation speaks against its implementation in a spreadsheet environment.

We claim:

1. A method for organizing a substantially uniform system of colorimetry comprising the steps of
   (i) taking a pseudoinverse of a matrix containing intensity values for existing non-uniform color-matching functions;
   (ii) empirically determining an opponency transformation matrix based on a plurality of substantially uniformly spaced color standards;
   (iii) transforming the matrix from step (i) to a color opponency color coordinate utilizing the opponency transformation matrix from step (ii) to obtain Red-Green, Yellow-Blue and Lightness (RG, YB and LT) color matching functions; and
   (iv) transforming the RG, YB and LT color matching functions from step (iii) non-linearly to color matching functions that produce colors recognizable as being uniform by human vision;
wherein the existing non-uniform color matching functions are transformed into substantially uniform color matching functions.

2. The method of claim 1, wherein the existing color matching functions are the 1964 CIE RGB (red, green and blue) color matching functions.

3. The method of claim 1 further comprising a step of normalizing the pseudoinverse matrix from step (i).

4. The method of claim 3, wherein in the normalizing step the area under each color-matching function is substantially equal to each other.

5. The method of claim 1, wherein the plurality of substantially uniformly spaced color standards is selected at substantially similar lightness values.

6. The method of claim 1, wherein the coordinates of the plurality of substantially uniformly spaced color standards are chosen to be uniform.

7. The method of claim 1, wherein step (iii) includes an iterative step of ensuring uniformity of the substantially uniform color matching function by plotting the RG, YB and LT color matching functions and adjusting the spacing between lines of equal differences in values, if necessary.

8. The method of claim 1, wherein step (iv) utilizes an inverse to Munsell's $5^{th}$ order function.

9. The method of claim 8, wherein after step (iv) the RG and YB color matching functions are expressed as RG and YB color matching functions in units of chroma.

10. The method of claim 1, wherein a color difference between two colors is calculated using the square root of the sum of squares in said substantially uniform system of colorimetry.

11. A substantially uniform system of colorimetry utilizing the method of claim 1.

* * * * *